United States Patent [19]

Boutaine et al.

[11] 3,824,396

[45] July 16, 1974

[54] METHOD AND APPARATUS FOR CHECKING POSITIONS OF BOTTOM END WALLS OF BLIND HOLES FORMED IN A PART AND IN PARTICULAR IN A GRAPHITE BLOCK

[75] Inventors: Jean-Louis Boutaine, Le Chesnay; Roko Bujas; Jean Tortel, both of Gif-sur-Yvette, all of France

[73] Assignee: Commissaritat a l'Energie Atomique, Paris, France

[22] Filed: May 18, 1973

[21] Appl. No.: 361,426

[30] Foreign Application Priority Data
May 31, 1972  France .......................... 72.19564

[52] U.S. Cl. ................................ 250/312, 251/321
[51] Int. Cl. ............................................ G01b 15/00
[58] Field of Search .......................... 250/312, 321

[56] References Cited
UNITED STATES PATENTS
3,447,924  6/1969  Trzyna ............................ 250/321
3,673,394  6/1972  Hartmann ........................ 250/312

*Primary Examiner*—James W. Lawrence
*Assistant Examiner*—C. E. Church
*Attorney, Agent, or Firm*—Ernest F. Marmorek

[57]  ABSTRACT

The positions of the axes of cylindrical blind holes bored in parallel relation in a block of solid material such as graphite are checked by directing a parallel and narrow beam of X-ray or gamma-ray photons along the axis of each blind hole towards the bottom of the hole. An inspection unit consisting of radiation-sensitive photographic film and placed outside the block opposite to the blind holes is employed in order to make a comparison between the points of intersection of the different beams with the inspection unit and the locations of the theoretical zones of tolerance which are traced on the film by means of beta-ray sources through a perforated mask which is positioned with high precision with respect to the block.

6 Claims, 3 Drawing Figures

METHOD AND APPARATUS FOR CHECKING POSITIONS OF BOTTOM END WALLS OF BLIND HOLES FORMED IN A PART AND IN PARTICULAR IN A GRAPHITE BLOCK

This invention relates to a method for checking the positions of the axes of cylindrical blind holes which are bored in parallel relation in a block of solid material.

The invention is also concerned with an apparatus which makes it possible to carry out said method.

It is known in particular that, in the graphite blocks employed in nuclear reactors, the thickness of the walls formed between the cylindrical holes which contain the fuel and also between the cooling channels must be accurately determined over the full height of the block.

Before making use of said blocks, it is therefore necessary to ensure that the thickness condition mentioned above is wholly satisfied, although it proves difficult in practice to achieve this result since provision is often made for holes having blind ends.

The methods which have been applied up to the present time are time-consuming and inaccurate since they consist in determining the positions of two points of the axis at the top portion of the blind hole and in assuming that the straight line connecting these two points in fact coincides with the axis of the blind hole down to the bottom of this latter.

It is clearly apparent that a method based on an extrapolation as just defined provides uncertain indications.

The present invention provides the possibility of ensuring that the thickness condition aforesaid is satisfied by means of a method which is both rapid and highly reliable and by virtue of the fact that checking operations are carried out at the bottom of each blind hole.

More precisely, the invention relates to a method for checking the positions of cylindrical blind holes which are bored in parallel relation in a block of solid material. The distinctive feature of the invention lies in the fact that a parallel and narrow beam of X-ray or gamma-ray photons is emitted along the axis of each blind hole in the direction of the bottom of said hole, that a comparison is made on an inspection unit comprising a radiation-sensitive film placed outside said block and opposite to said blind holes between the locations of the points of intersection of the different X-ray photon or gamma-ray beams with said inspection unit and the locations of the theoretical zones of tolerance which are traced on said sensitive film by beta-ray sources through a perforated mask which is positioned with a high degree of accuracy with respect to the block of solid material.

The method according to the invention therefore makes it possible, by obtaining directly on the photographic film both the desired theoretical positions of the axes of the holes and the real positions thereof together with an indication of the tolerance zone in respect of each axis, to find a very simple solution to the problem involved in checking the positions of the axes of blind holes which are bored in a block of solid material.

The invention is also concerned with an apparatus which permits the practical application of said method and which essentially comprises a source-holder unit formed of material having a very high atomic number and provided with a central cavity, a passageway having a small cross-sectional area for connecting said central cavity to one end of said source-holder unit, a grappling element located at the other end of said source-holder unit, centering means which surround the external lateral surface of said unit and are coaxial with said passageway, and an X-ray photon or gamma-ray source housed within said central cavity and surrounded by a jacket formed of material which has a very low absorptive capacity for X-ray or gamma-ray photons, said passageway being intended to serve as collimator for the photons of said source. Said apparatus further comprises an inspection unit which is intended to receive on a photographic film the beam of X-ray or gamma-ray photons which are emitted by said source and pass into said collimator as well as means for tracing on the photographic film the zones of tolerance within which the point of impact of said X-ray or gamma-ray photons of said beam is intended to be located on said film, said inspection unit being provided with means for accurate positioning with respect to the block of solid material to be tested.

It is an advantage in accordance with the invention to design the inspection unit in the form of a cassette which incorporates both the radiation-sensitive photographic film, a mask which is perforated in accordance with the exact image of the tolerance zones and at least one source of beta rays located on the opposite side of the mask with respect to the film. Under these conditions, the mask is secured to said cassette in such a manner as to ensure that its position with respect to this latter is stationarily fixed. Accordingly, the cassette itself is accurately positioned with respect to the block of solid material in which are bored the blind holes to be tested. The perforated mask can be constituted by any known material which intercepts beta radiation; in a preferred embodiment of the invention, the mask has been fabricated from a simple sheet of nickel.

The source which is employed for tracing the zones of tolerance on the film through the mask can theoretically be of any desired type, the only pre-requisite condition being that the mask should effectively intercept the radiation emanating from the source. However, the most simple solution in practice consists in employing a beta-ray source such as $C_{14}$, for example. Moreover, and in particular instances, especially in the case of a surface to be tested having a large area, it can clearly prove necessary to employ a number of beta-ray sources each corresponding to a portion of the surface of the mask.

In some forms of construction, the photographic film of the viewing device is replaced by a fluorescent screen which can in some case be associated with a system for application of brightness.

Further properties and advantages of the present invention will be brought out by the following description in which one embodiment of the invention is given by way of explanation but not in any limiting sense, reference being made to the accompanying drawings, wherein:

FIG. 2 shows one embodiment of the perforated mask, a detail of which is illustrated to a larger scale in FIG. 2a;

FIG. 3 shows another embodiment of the perforated mask, a detail of which is illustrated to a larger scale in FIG. 3a.

Figure 1:
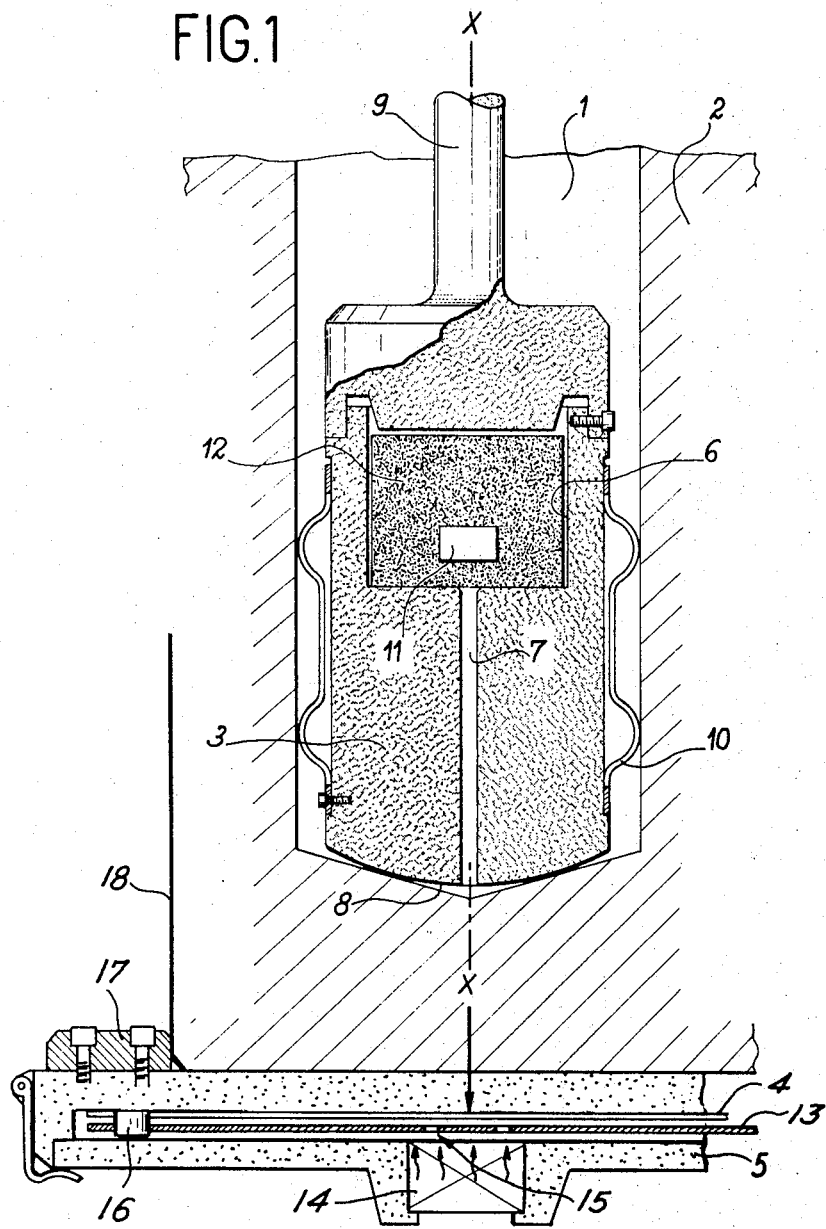
FIG. 1 is a longitudinal sectional view of an apparatus according to the invention which is fitted with its inspection unit together with the photographic film which is placed within a cassette.

The apparatus which can be seen in FIG. 1 is intended to be placed in the blind hole 1 of a block 2 having a series of blind holes such as the hole 1 to be checked for the position of the bottom portion thereof and is constituted by a cylindrical source-holder unit 3 of revolution and a photographic film 4 which is placed within a cassette 5.

The source-holder unit 3 comprises:

a. a central cavity 6, b. a passageway 7 having a small transverse cross-section and providing a connection between the cavity 6 and the lower end 8 of the unit 3 which is applied against the bottom end-wall of the blind hole, c. a grappling element 9 for introducing the complete source-holder unit into the blind hole 1, d. a resilient ring 10 for centering the source-holder unit and causing the axis of the passageway 7 to coincide with the axis X-X of the hole 1, e. a photon source 11 housed within the cavity 6 and surrounded by a jacket 12 formed of material which has a very low absorptive capacity for photons (X-ray or gamma-ray photons).

The source-holder unit 3 performs three functions which consist:

in permitting the handling of the X-ray or gamma-ray photon source 11;

in ensuring accurate centering of said source within the blind hole 1 to be checked;

in producing a beam of useful photons which is as narrw and parallel as possible and perfectly centered within said hole.

To this end, the front portion of the source-holder unit is formed of material having a density and atomic number which are as high as possible (lead alloy, antimony, tungsten, depleted uranium) in order to eliminate in practice the photons other than those which pass through the collimator 7 and which would not fail to produce an increase in background on the emulsion of the photographic film.

The passageway 7 has a suitable height (10 to 20 mm, for example) and a cross-sectional area which is as small as possible (0.05 to 0.1 mm$^2$, for example); said passageway can have the cross-sectional shape of a circle, a square, a cross and so on.

Depending on the thickness and the composition of the material of the block 2, the source 11 must emit X-ray or gamma-ray photons of suitable energy. It is possible to employ radioelements such as: iridium-192, thulium-170, ytterbium-169, europium-155, prometheum-147, cadmium-109, iodine-125, americium-241, etc.

It is important to ensure that the dimensions of the radioactive source 11 are as small as possible (less than 1 mm) while permitting acceptable exposure times. It is therefore preferable to make use of radioactive products having an activity concentration which is as high as possible.

The jacket 12 of the source 11 must afford complete safety and be accepted as a source which is sealed in a special form in accordance with French and international standards.

The material which constitutes the jacket 12 or at least the material employed for that portion of said jacket which is directed towards the passageway 7 must have the lowest possible absorptive capacity for the X-ray photons or gamma-ray photons which are emitted. By way of example, a titanium-base alloy can be employed for this purpose.

The cassette 5 of FIG. 1 further comprises a mask 13 which is perforated in order to provide a number of reference apertures 14 which are printed on the photographic film 4 by means of beta-ray sources such as the the source 15. In accordance with the invention, the mask 13 is positioned with respect to the cassette 5 in a highly accurate manner by press-fitting on this latter at 16. Similarly, the exact position of the cassette 5 with respect to the block 2 is fixed in the example described by meanss of the reference stop 17 which is applied against the vertical wall 18 of the block 2. The cassette 5 must clearly be formed of thin material which is in any case transparent to X-rays and alpha-rays; in the embodiment shown in FIG. 1, the cassette is fabricated from aluminum.

If it is desired to check simultaneously the lower ends of a number of blind holes formed in a block such as the block 2, a source-holder unit such as the unit 3 is placed within each blind hole but it is necessary to have recourse to only one inspection unit for the entire assembly and, in particular, only one photographic film such as the film 4.

In practice, use is made of an industrial radiographic film of the single or double layer type or a film for graphic arts; this film can be associated with a filter which is intended to reduce the background associated with parasitic scattered radiation. If necessary, the filter can be provided with calibrated holes corresponding to the theoretical positions of the blind holes to be checked.

The film is advantageously exposed while being associated or not with front and/or rear metallic screens which may be fitted within the cassette 5.

The choice of the film, of the filter, of the screen and the cassette must be made as a function of the nature and the thickness of the material to be checked and of the source employed.

By way of example, reference will now be made to FIGS. 2 and 3 which show two particular embodiments of the perforated mask 13.

Figure 2:
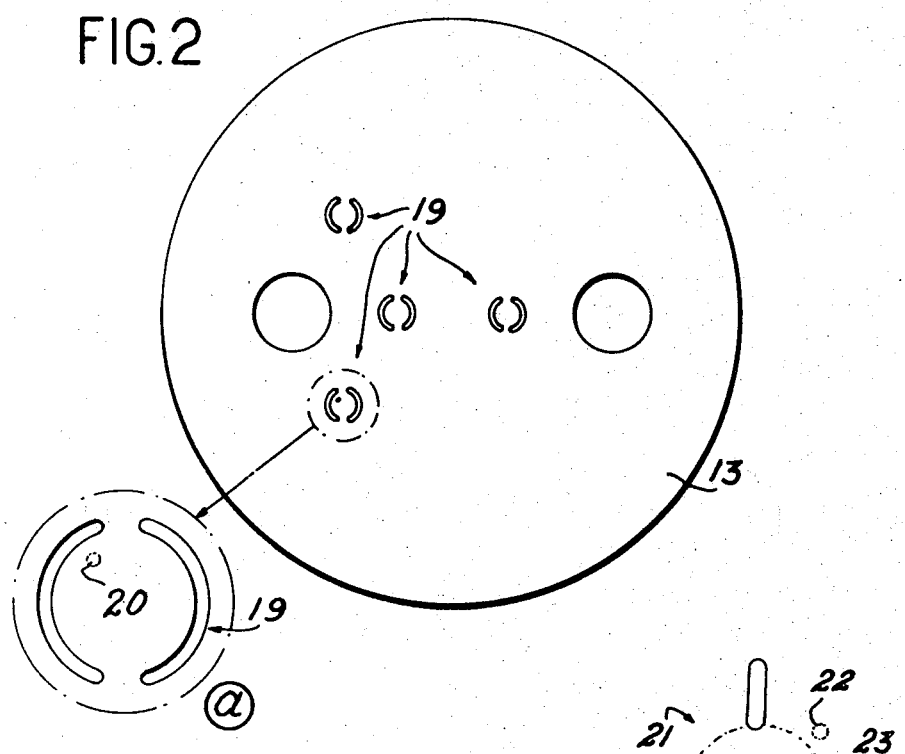

In the case of FIG. 2, semi-circular slots such as those designated by the reference 19 are intended to reproduce on the film 4 the tolerance zones in which the impact corresponding to the axis of one of the blind holes is intended to be located. In the event that said impact as shown at 20 in FIG. 2a is located within the tolerance circle on the film, it is accordingly deduced therefrom that the position of the corresponding axis is correct.

Figure 3:
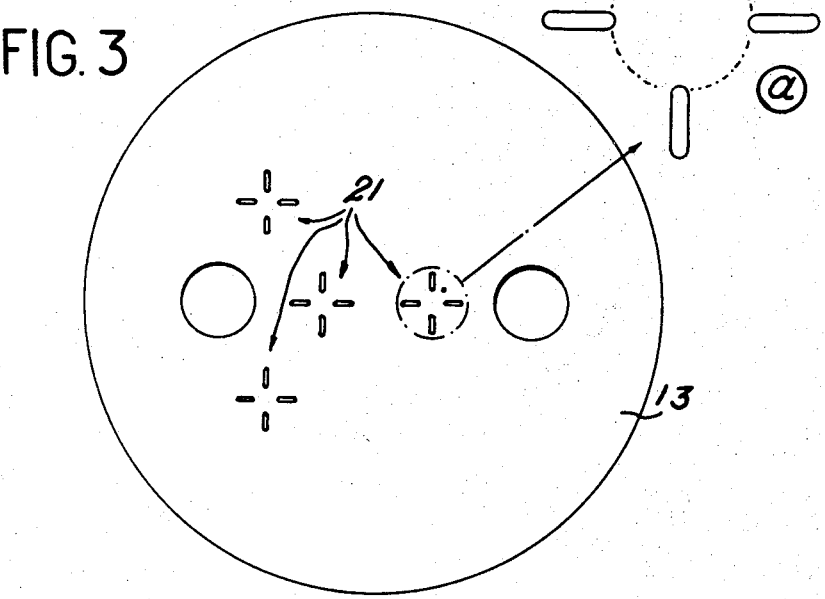

In FIG. 3, the exact theoretical position and the tolerance zones are defined in the mask 13 by systems of four rectilinear slots 21 in the shape of a cross. In FIG. 3a, there is shown at 22 the trace left on the film by the position of one of the axes in the event that this latter is located outside the tolerance circle 23 and is consequently inacceptable.

What we claim is:

1. A method for checking the positions of the axes of cylindrical blind holes which are bored in parallel relation in a block of solid material, wherein a parallel and narrow beam of X-ray or gamma-ray photons is emitted along the axis of each blind hole in the direction of the bottom of said hole, wherein a comparison is made on an inspection unit comprising a radiation-sensitive film placed outside said block and opposite to said blind holes, between the locations of the points of intersection of the different X-ray photon or gamma-ray beams with said inspection unit and the locations of the theoretical zones of tolerance which are traced on said sensitive film by beta-ray sources through a perforated mask which is positioned with a high degree of accuracy with respect to said block of solid material.

2. An apparatus for the practical application of the method according to claim 1, wherein said apparatus essentially comprises on the one hand a source-holder unit formed of material having a very high atomic number and provided with a central cavity, a pasageway having a small cross-sectional area for connecting said central cavity to one end of said source-holder unit, a grappling element located at the other end of said source-holder unit, centering means which surround the external lateral surface of said unit and are coaxial with said passageway, and an X-ray photon or gamma-ray source housed within said central cavity and surrounded by a jacket formed of material which has a very low absorptive capacity for X-ray or gamma-ray photons, said passageway being intended to serve as collimator for the photons of said source and, on the other hand, an inspection unit which is intended to receive on a photographic film the beam of X-ray or gamma-ray photons which are emitted by said source and pass into said collimator as well as means for tracing on the photographic film the zones of tolerance within which the point of impact of said X-ray or gamma-ray photons of said beam is intended to be located on said film, said inspection unit being provided with means for accurate positioning with respect to the block of solid material to be tested.

3. An apparatus according to claim 2, wherein the inspection unit comprises within a single cassette the photographic film, a mask which is perforated in accordance with the exact image of the tolerance zones and at least one source of beta-rays located on the opposite side of the mask with respect to the film, said mask being secured to said cassette.

4. An apparatus according to claim 3, wherein the mask is constituted by a sheet of nickel.

5. An apparatus according to claim 2, wherein the means for positioning the inspection unit are constituted by centering studs which are intended to cooperate with cavities formed in the block of solid material.

6. An apparatus according to claim 2, wherein the means for positioning the inspection unit are constituted by reference stops which are intended to cooperate with cavities formed in the walls of the block of solid material.

* * * * *